(12) United States Patent
Alvarez Bonilla

(10) Patent No.: US 11,512,482 B2
(45) Date of Patent: Nov. 29, 2022

(54) DEVICE FOR CONNECTING AND SEPARATING MASONRY UNITS

(71) Applicant: SIC SPA, Santiago (CL)

(72) Inventor: Antonio Alvarez Bonilla, Santiago (CL)

(73) Assignee: SIC SPA, Santiago (CL)

( * ) Notice: Subject to any disclaimer, the term of this patent is extended or adjusted under 35 U.S.C. 154(b) by 499 days.

(21) Appl. No.: 16/304,478

(22) PCT Filed: May 26, 2016

(86) PCT No.: PCT/CL2016/050026
§ 371 (c)(1),
(2) Date: Nov. 26, 2018

(87) PCT Pub. No.: WO2017/201633
PCT Pub. Date: Nov. 30, 2017

(65) Prior Publication Data
US 2019/0292801 A1  Sep. 26, 2019

(51) Int. Cl.
*E04G 21/18* (2006.01)
*E04B 2/16* (2006.01)
(Continued)

(52) U.S. Cl.
CPC .......... *E04G 21/1883* (2013.01); *E04B 2/16* (2013.01); *E04B 2/44* (2013.01); *E04G 21/18* (2013.01);
(Continued)

(58) Field of Classification Search
CPC ..... E04B 2002/0243; E04B 2002/0245; E04B 2/18; E04B 2/46; E04B 2/16; E04B 2/44;
(Continued)

(56) References Cited

U.S. PATENT DOCUMENTS 1,051,427 A * 1/1913 McCluskey ......... F16L 37/0925
403/292
3,430,404 A * 3/1969 Muse ....................... E04B 2/46
52/439
(Continued)

FOREIGN PATENT DOCUMENTS

CL           42628       2/2005
DE       3428148 A1     2/1986
(Continued)

OTHER PUBLICATIONS

Machine Translation of KR 101493939B1, http://engpat.kipris.or.kr/engpat/biblioa.do?method=biblioFrame, May 5, 2021 (Year: 2021).*
(Continued)

*Primary Examiner* — Ryan D Kwiecinski
(74) *Attorney, Agent, or Firm* — Hamre, Schumann, Mueller & Larson, P.C.

(57) ABSTRACT

The present invention relates to a device for connecting and separating masonry units, preferably bricks, which comprises a tubular body that fits the tubular shape of holes in the bricks. The device for connecting and separating comprises a portion that has a straight cross-section larger than the cross-section of the tubular body and disposed approximately midway along the length of the connector device, for separating the bricks that said device connects. The device also comprises at least one depression or channel along the entire length of the tubular body, the depression or channel acting as a spring. The connector allows walls to be assembled using only bricks and connectors so as to apply mortar ex post.

19 Claims, 13 Drawing Sheets

(51) Int. Cl.
*E04B 2/44* (2006.01)
*F16B 13/02* (2006.01)

(52) U.S. Cl.
CPC ........ *F16B 13/025* (2013.01); *E04G 21/1825* (2013.01)

(58) Field of Classification Search
CPC ...... F16B 13/02; F16B 13/025; F16B 13/141; A63H 33/04; A63H 33/044; E04G 21/1883; E04G 21/1825; E04G 21/1841; E04G 21/18; E04G 23/0218
USPC .................................................. 52/585.1, 606
See application file for complete search history.

(56) References Cited

U.S. PATENT DOCUMENTS

| | | | | |
|---|---|---|---|---|
| 3,479,782 A * | 11/1969 | Muse | ........................ | E04B 2/26 52/438 |
| 3,609,926 A * | 10/1971 | Muse | ........................ | E04B 2/44 52/439 |
| 3,864,885 A * | 2/1975 | Muse | ........................ | E04B 2/44 52/439 |
| 4,110,949 A * | 9/1978 | Cambiuzzi | ................ | E04B 2/42 52/437 |
| 4,947,610 A | 8/1990 | Koerner | | |
| 4,965,978 A * | 10/1990 | Scheiwiller | ............... | E04B 2/18 52/421 |
| 5,347,787 A * | 9/1994 | Gavin | ..................... | E04C 5/203 248/74.3 |
| 5,595,039 A * | 1/1997 | Lowery | ................... | E04C 5/206 52/678 |
| D382,463 S * | 8/1997 | Cloud | ........................... | D8/354 |
| 5,685,682 A * | 11/1997 | Glime | .................. | F16B 21/082 411/510 |
| 6,385,938 B1 * | 5/2002 | Gavin | ..................... | E04C 5/203 52/678 |
| 6,571,526 B2 * | 6/2003 | Queen | ..................... | E04C 5/168 52/686 |
| 6,996,945 B2 | 2/2006 | Doty | | |
| 7,404,274 B2 | 7/2008 | Hayes | | |
| 7,451,579 B2 * | 11/2008 | Azarin | ..................... | E04C 5/203 248/74.3 |
| 7,726,090 B2 * | 6/2010 | Verelli | .................... | E04C 5/203 52/583.1 |
| 8,327,599 B2 * | 12/2012 | Gavin | ..................... | E04C 5/203 52/680 |
| 8,955,282 B2 * | 2/2015 | Yap Ching | ................ | E04B 2/24 52/562 |
| 9,303,400 B2 * | 4/2016 | Maeers | ..................... | E04B 2/16 |
| 9,605,429 B2 * | 3/2017 | Yang | ......................... | E04B 1/38 |
| 9,745,752 B2 * | 8/2017 | Strabala | .................. | E04C 5/203 |
| D876,928 S * | 3/2020 | Cramer | ........................ | D8/354 |
| 11,174,614 B2 * | 11/2021 | Flint | ....................... | E02D 29/05 |
| 2004/0040249 A1 | 3/2004 | Herbison | | |
| 2013/0212956 A1 | 8/2013 | Olaes | | |

FOREIGN PATENT DOCUMENTS

| | | | | |
|---|---|---|---|---|
| FR | 2862993 A1 * | 6/2005 | ............... | E04B 2/18 |
| GB | 2363807 A * | 1/2002 | ............... | E04B 2/08 |
| KR | 101386209 B1 * | 4/2014 | | |
| KR | 101493939 B1 * | 2/2015 | | |
| WO | WO-0222978 A1 * | 3/2002 | ............... | E04B 2/04 |
| WO | WO-2007021090 A1 * | 2/2007 | ............... | E04B 2/06 |
| WO | WO-2010012050 A1 * | 2/2010 | ........... | A63H 33/101 |
| WO | 2015181582 | 12/2015 | | |

OTHER PUBLICATIONS

Machine Translation of KR 101386209B1, http://engpat.kipris.or.kr/engpat/biblioa.do?method=biblioFrame, May 5, 2021 (Year: 2021).*
International Search Report and Written Opinion, International Patent Application PCT/CL2016/50026, dated Dec. 20, 2016 (8 pages).

* cited by examiner

DEVICE FOR CONNECTING AND SEPARATING MASONRY UNITS

FIELD OF APPLICATION

This invention relates to a device for connecting and at the same time standardizing the separation between masonry units in the construction of walls, preferably of industrial clay bricks, whether solid or hollow, but which have a pair of holes in which to introduce the connectors or separators, which tremendously eases the construction process, making it quicker and less intensive in manpower, but also with better results.

BACKGROUND

The ceramic brick is one of the oldest construction materials that exists, and which is widely used until today mainly for it's thermal and acoustic properties, besides the great aesthetic appreciation it enjoys in different cultures. Despite the above, in many places it is not used as much as the consumer wants, and this is due to the scarcity and high cost of skilled labor.

The shapes of the bricks, their technical characteristics and methods of use, vary considerably from place to place, even within the same country or region, and this is basically due to two reasons: the subjective or traditional and cultural reasons, and on the other hand the objective or practical reasons, and in the latter group the main factors are geographic, climatic and seismic characteristics that determine the shape of the bricks in different places.

Thus in Brazil, a country exempt from earthquakes, the bricks have a high percentage of void volume compared to baseline volume and their position in the walls is not important, as they are usually plastered, and structural forces that they must endure are basically due to the weight of the construction.

On the east coast of the United States, in regions where tornadoes occur, most of the houses are made of wood, which are totally destroyed with the passage of tornadoes, but not masonry houses which are less frequent. But experts say this is partly for traditional reasons and mainly due to the higher cost of masonry homes. Instead in the California area, a region of large earthquakes, the use of masonry is minimal for a cultural reason, because it is thought that the use of bricks is not good at withstanding major earthquakes.

In Chile, however, the most seismic country in the world along with Japan, hollow masonry bricks are widely used for building houses of two and three stories without using reinforced concrete pillars, but emulating them in the holes of the main bricks with a steel rod and filling them with grout (a more resistant mixture than the one that is used to stick the units). The brick which is used in addition to having its two main holes, has a number of smaller holes distributed in the rest of the surface, but where the void volume is less than 50% of the baseline volume of the brick, i.e., the volume of the outer parallelepiped rectangular shape. This construction system showed a very good performance during the last major earthquake of 8.8 on the Richter scale occurred in central Chile on Feb. 27, 2010.

In Chile this construction system is called Reinforced Masonry and is widely used in the construction of housing for the middle and low socioeconomic strata. However, the procedure is quite precarious, since it considers the installation of pillars at both ends of the wall, with marks of the level of each row, including a tense thread that serves as a reference for leveling and aligning each brick, only building up to 1.2 meters in a shift, the method is slow, cumbersome and fallible, therefore, the results depend too much on the neatness of the builders, who are increasingly scarce and expensive in terms of labor. For this reason, the results are not always good and often incur costs of repairing the walls. To this we must add that the system allows malpractices that can decrease the resistance of a wall up to 50%, which is not detectable or reparable.

This is the reason why masonry has lost ground in construction compared to other, faster methods that give greater assurance of good results. Masonry is not only being replaced by new lighter and inexpensive systems, but also by Reinforced Concrete, which is significantly more expensive.

To facilitate the construction process, in places like Mexico, masonry blocks with a tongue and groove system are made. But as these blocks cannot be produced by extrusion, such as clay, they are manufactured with a wet cementitious mixture and by compression. However, these blocks have very low resistance to all types of forces and are not comparable with clay bricks.

An interesting innovation is a concrete block designed at Harvard, whose shape allows interlocking of units in both the longitudinal and transverse direction to the wall. It also has an insulating material inside. But as a result, their manufacture is complex and is not comparable with clay brick. However these initiatives come to demonstrate the precariousness of the traditional process of masonry, a situation that dims when the walls do not need to withstand large forces, because in those cases a very thin layer of mortar and leveling of each brick is much easier, plus they are lighter.

An innovation, not in masonry units, but in relation to the construction of walls, is the development by the US company Construction Robotics, of a sophisticated mason robot that takes a brick, applies a layer of fresh mortar and through a series of sensors installs it in the exact position, thus the bricklayer is responsible for making the mix for the robot and doing the stonework, that is to say, removing excess mortar and refining the shape of the joints between bricks. The robot doubles the productivity of a human bricklayer and works only in the straight part of the walls (not in corners) and it seems that its use is only justified in walls of large dimensions, where the brick is used as an exterior wall for the structural walls made with concrete blocks.

Thanks to the low dimensional variability of hollow bricks, and using the fact that they are designed such that the main cavity of each block matches the blocks of the adjacent rows, all the previously mentioned problems, and their existence in the art, can be avoided if before applying the mortar a solid object of a suitable material is installed in all these holes, for example plastic or metal, which conforms to the tubular shape of these cavities vertically aligning the holes of the adjacent rows but in turn separating them with a wider section in the middle. A solution of this type is described in the Chilean Patent 42,628. However, the solution described by this patent has not proved to be entirely efficient, since small variations in the dimensions of the holes where these separators are installed make it difficult to install in some cases, and produce some distortions in the walls

TECHNICAL SOLUTION

In view of the problems described above, the present invention is based on the connector of Chilean Patent 42,628, but improving the ability of the connector to adapt to the variations of the gaps. The way to make the connector has the ability of reducing the basal contour of its cross section, to be adapted to the variations of the hollows of the bricks, is by incorporating an interruption in the contour or the transverse profile of the tubular body along its entire length, which in the case of a circular profile can be a groove, but in all other types of contours or profiles, it can be through one or more channels, which in the profile of the tubular body are seen as arcs inwards of the connector. This curved union should be of a thickness less than that of the tubular body, so that it can act in an elastic manner.

Consequently, by making a recess or chamfer outwards at the ends of the tubular body, the channels form a sort of nail or flap, which facilitates insertion of the connector into the holes and fit bricks already installed with connectors; this recess can be curved or straight and the width should be similar to the depth of the channels. As the connector is preferably plastic, the thickness of the channel should be less than the rest of the tubular body, as this facilitates the bending of the arches and the adjustment of the connector to fit the hole in the brick.

DESCRIPTION OF THE FIGURES

In order that the present invention is clearly understood and carried out easily, it has been shown in its preferred embodiments by means of the following illustrative and non-limiting figures that accompany this description and in which.

DETAILED DESCRIPTION OF THE INVENTION

Figure 1:
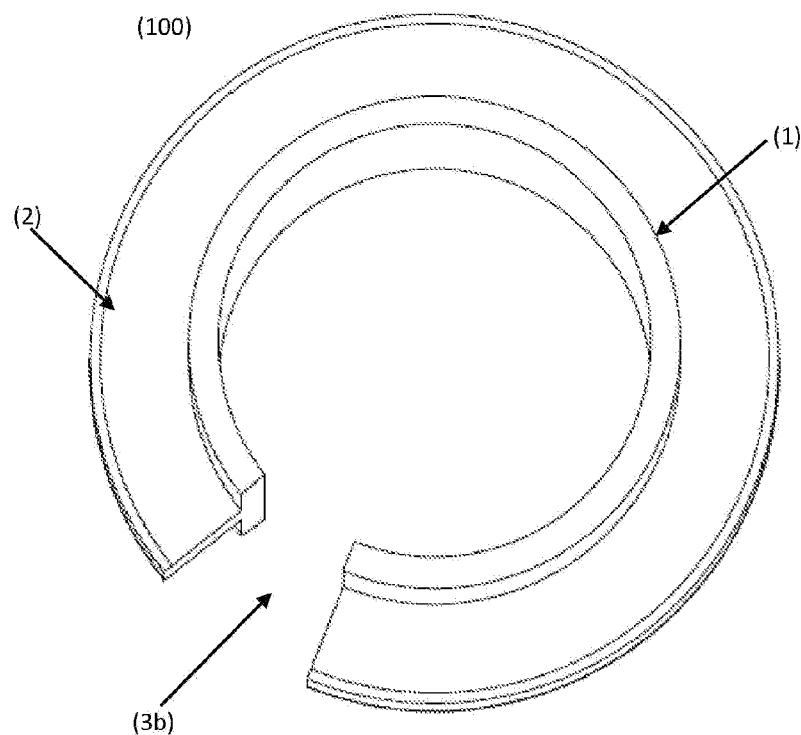
FIG. 1 shows the top view of a connecting device or connector, with circular cross-section and a slot, according to an embodiment of the invention.
Figure 2:
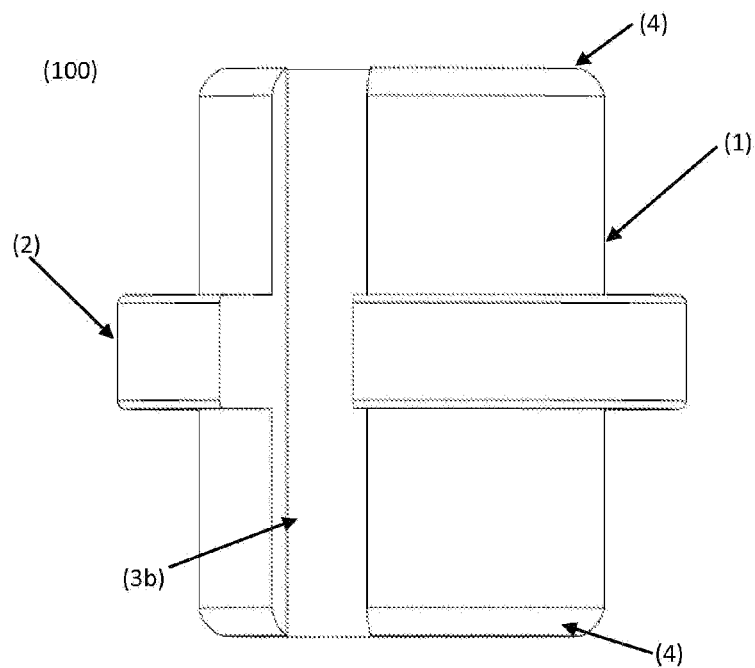
FIG. 2 shows the side view of a connecting device or connector, with circular section and a slot, according to an embodiment of the invention.
Figure 3:
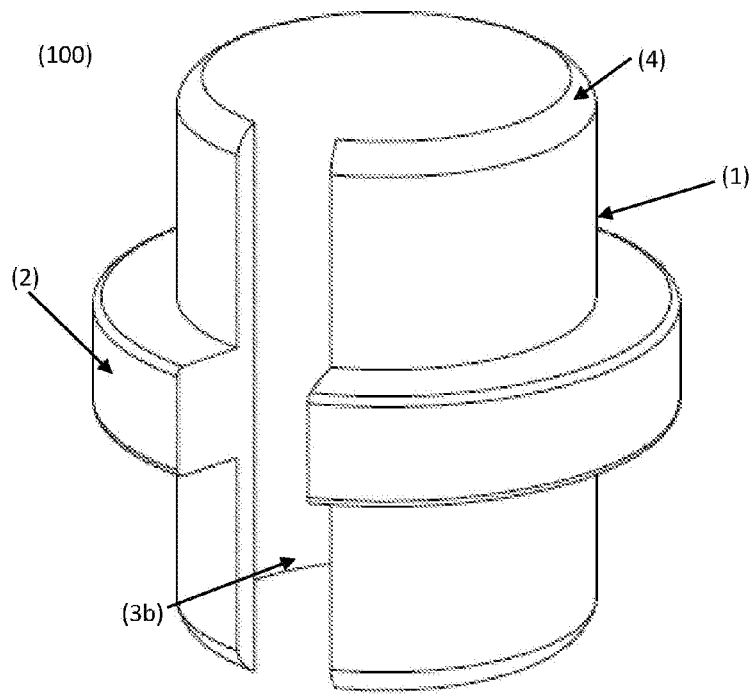
FIG. 3 shows the perspective view of a connecting device or connector with a circular section and a slot, according to an embodiment of the invention.
Figure 4:
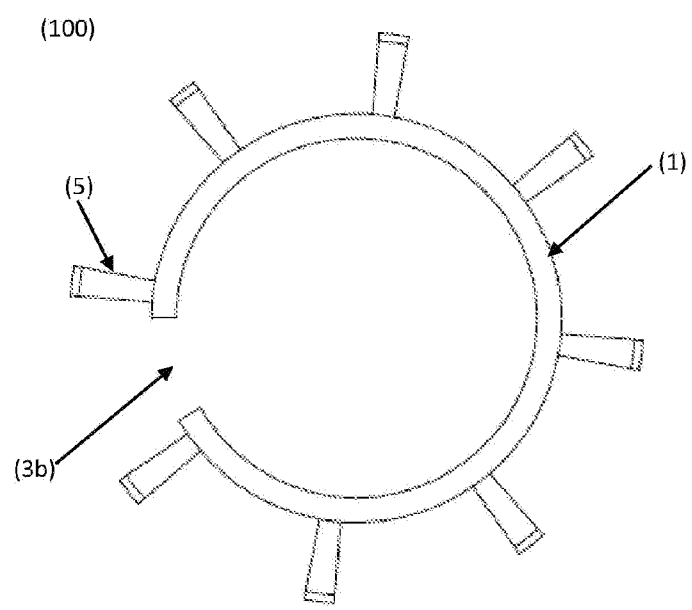
FIG. 4 shows the top view of a connecting device or connector, with circular section and a slot, including projections, according to an embodiment of the invention.
Figure 5:
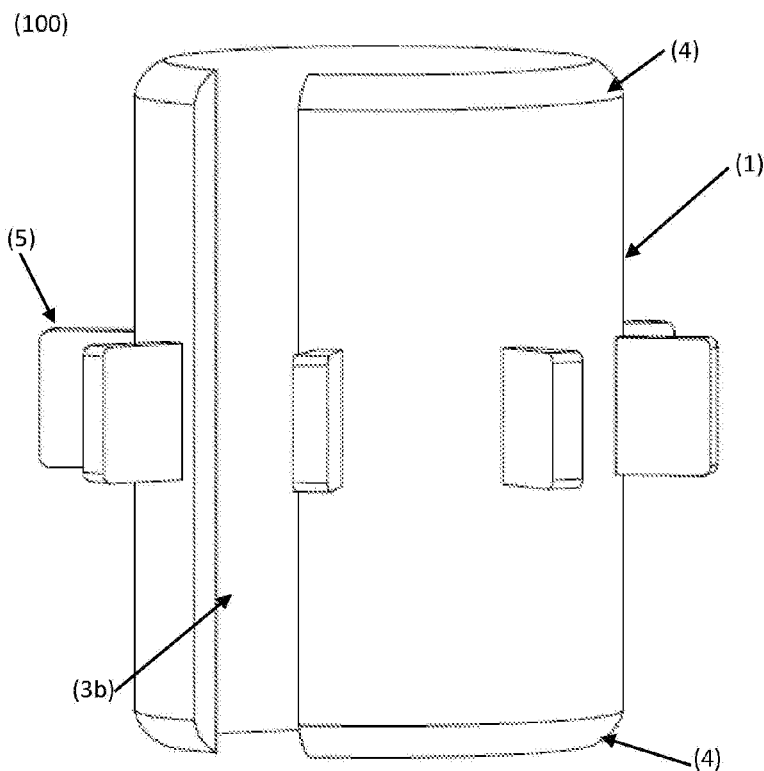
FIG. 5 shows the side view of a connecting device or connector, with circular section and a slot, including projections, according to an embodiment of the invention.
Figure 6:
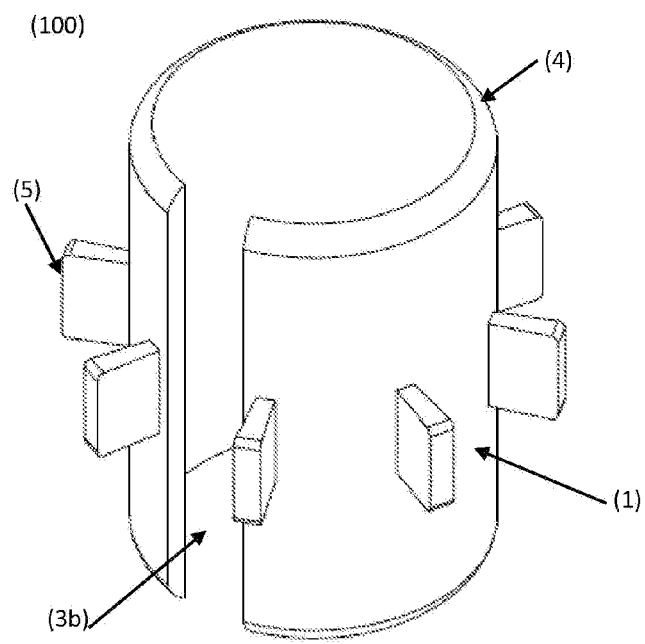
FIG. 6 shows the perspective view of a connecting device or connector with a circular section and a slot, including projections, according to an embodiment of the invention.
Figure 7:
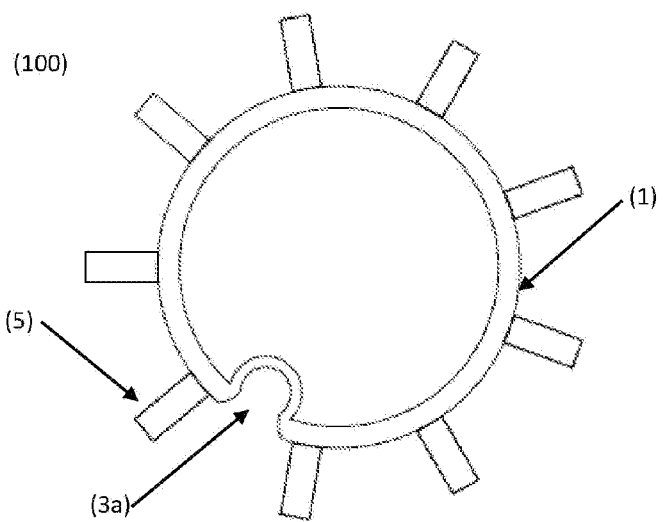
FIG. 7 shows the top view of a connecting device or connector, with circular section and a channel, according to an embodiment of the invention.
Figure 8:
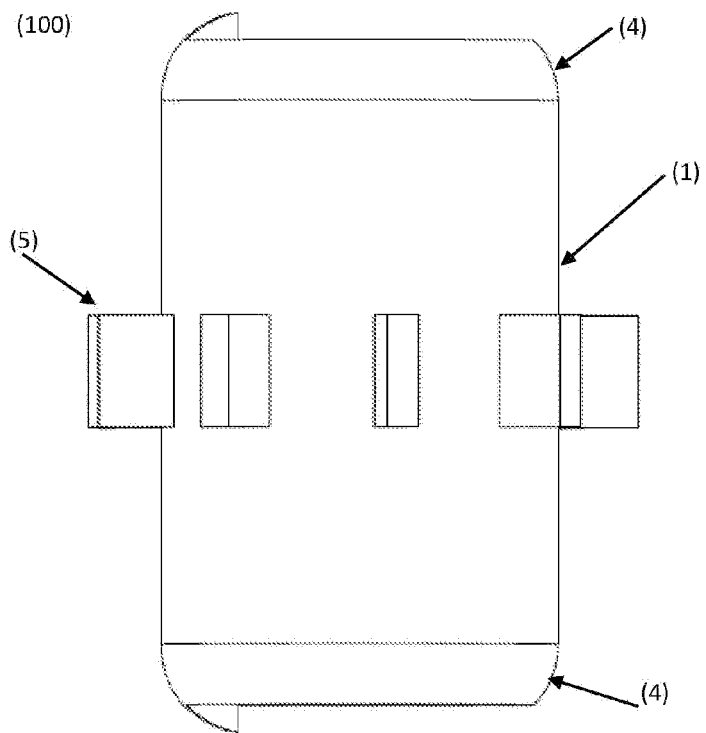
FIG. 8 shows the side view of a connecting device or connector, with circular section and a channel, according to an embodiment of the invention.
Figure 9:
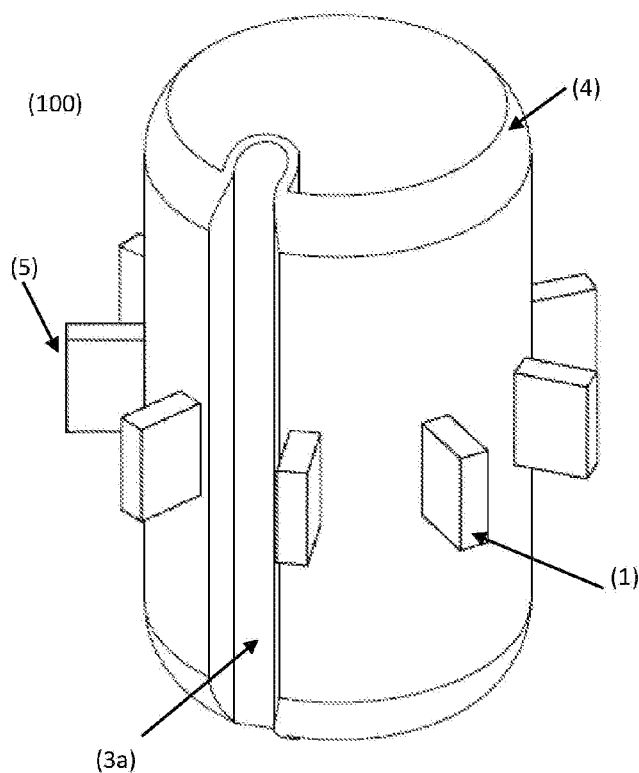
FIG. 9 shows the perspective view of a connecting device or connector, with circular section and a channel, according to an embodiment of the invention.
Figure 10:
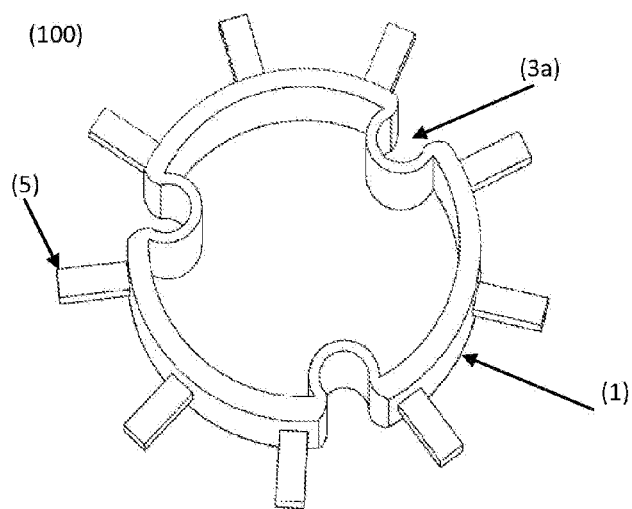
FIG. 10 shows the top view of a connecting device or connector, with circular section and three channels, according to an embodiment of the invention.
Figure 11:
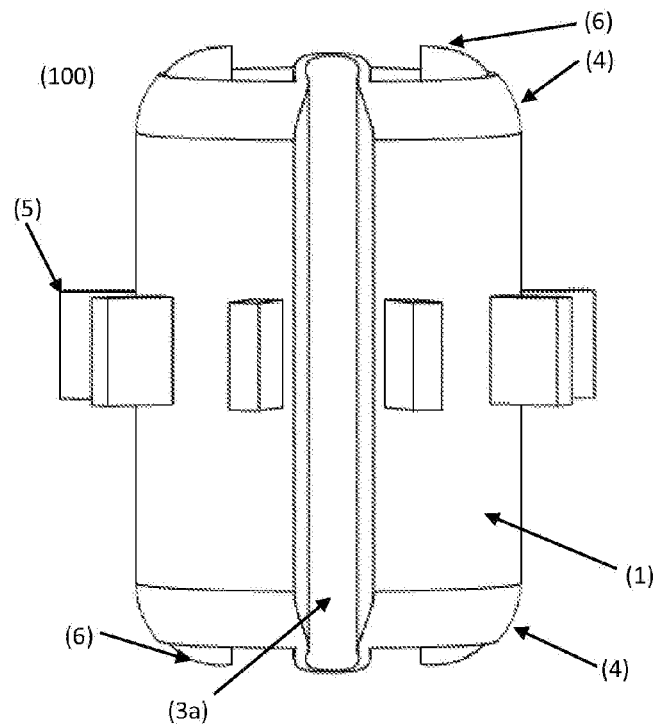
FIG. 11 shows the side view of a connecting device or connector, with circular section and three channels, according to an embodiment of the invention.
Figure 12:
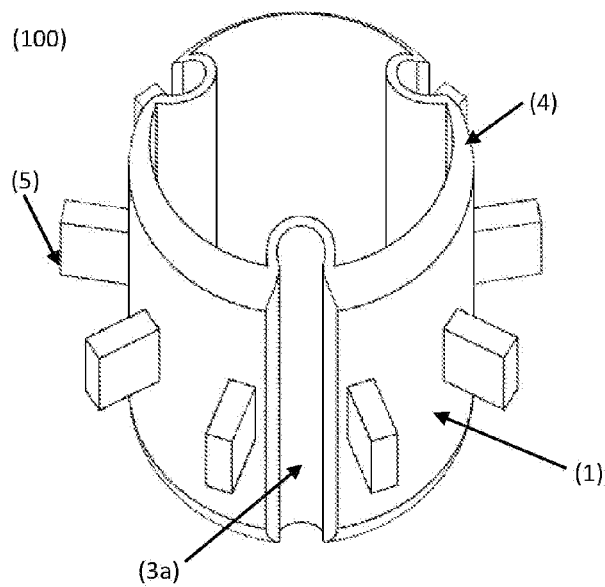
FIG. 12 shows the perspective view of a connecting device or connector, with circular section and three channels, according to an embodiment of the invention.

This invention relates to a device (100) for connecting and separating masonry units, preferably bricks. This connector device (100) is composed of a single piece, of a suitable material, such as plastic, and has a shape which allows its easy introduction into the holes in bricks, in turn being able to accommodate to the dimensional variations of them, producing the vertical alignment of hollow bricks, while generating a uniform separation of the masonry units.

The device (100) comprises of a tubular central body (1) conforming to the shape, also tubular, of the holes in bricks.

The connecting and separating device (100) comprises of a section (2) with a cross-section larger than the cross-section of the tubular body (1). Said portion (2) it is located preferably at half the length of said connector device (100).

The portion (2) can cause separation between the connecting bricks. The tubular body (1) further comprises at least one groove or channel (3a) or slot (3b) over the entire length of the tubular body (1) of the device (100), as shown in FIGS. 1 to 6 in the case of slot, and FIGS. 7 to 25 in the case of groove or channel. Thus, the slot (3b) allows acting elastically to the remaining contour of the tubular body when being mounted in the holes of the bricks, giving greater flexibility to the connection.

The same ability to elastically reduce the basal contour of the cross section of the device (100) is produced by the groove or channel (3A); at least one in the case of circular cross section (FIGS. 7 to 13) and at least two grooves or channels in the case of rectangular or square cross section as shown in FIGS. 14 to 25.

In the preferred embodiment of the invention, shown in FIGS. 8 to 25, the device (100) comprises a recess or chamfer (4), curved or straight, on the outer edge of both ends of the tubular body (1). Said recess begins at the innermost part of the channel or groove. This recess allows a kind of projection or nail at the ends of each channel to be formed, which facilitates insertion of the device (100) in the holes of the bricks and also in those connectors which are already installed on the wall, which improves the connection between the bricks.

When the cross-section of the tubular body (1) is circular, in a preferred embodiment of the invention, the device (100) comprises at least three channels or grooves (3a), as shown in FIGS. 10 to 13.

Figure 14:
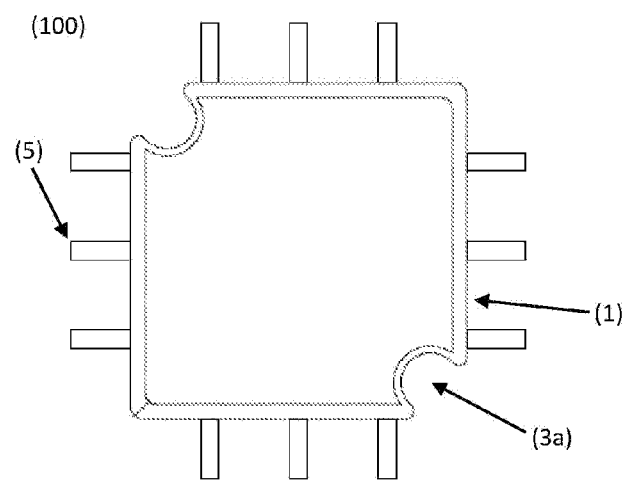
FIG. 14 shows the top view of a connecting device or connector, with square section and two channels on opposite vertices, according to an embodiment of the invention.
Figure 15:
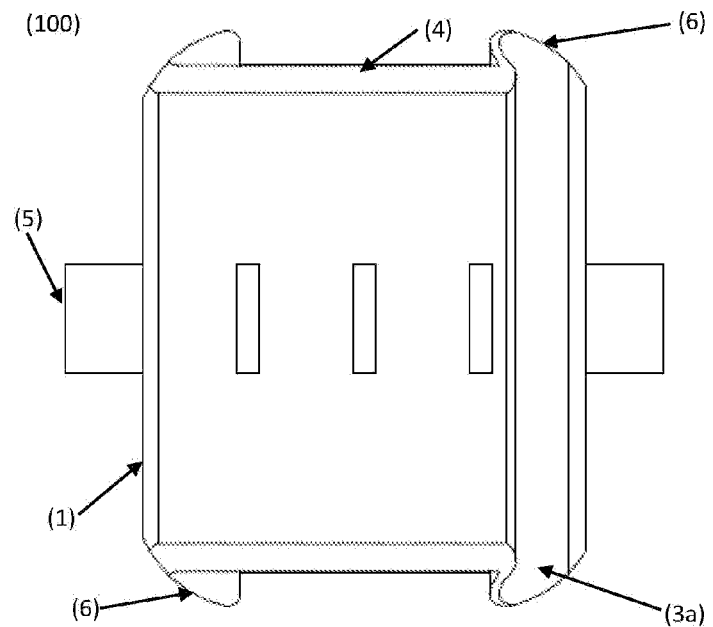
FIG. 15 shows the side view of a connecting device or connector, with square section and two channels on opposite vertices, according to an embodiment of the invention.
Figure 16:
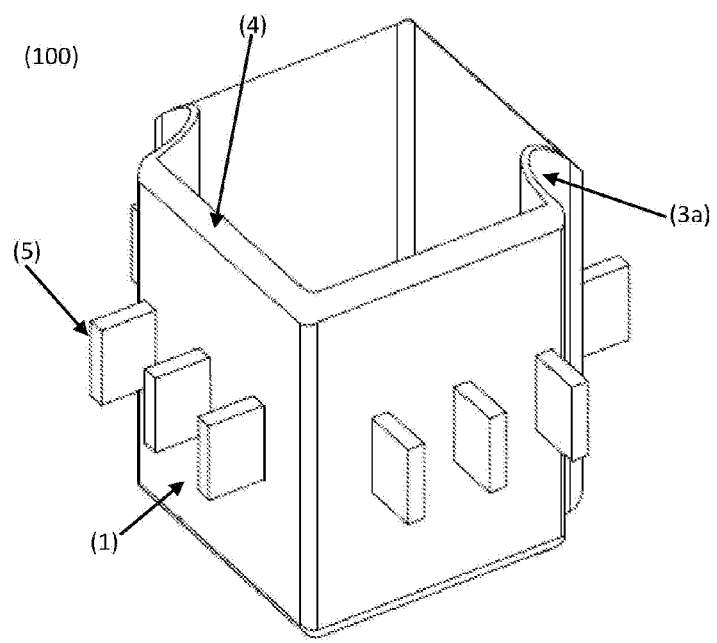
FIG. 16 shows the perspective view of a connecting device or connector, with square section and two channels on opposite vertices, according to an embodiment of the invention.
Figure 17:
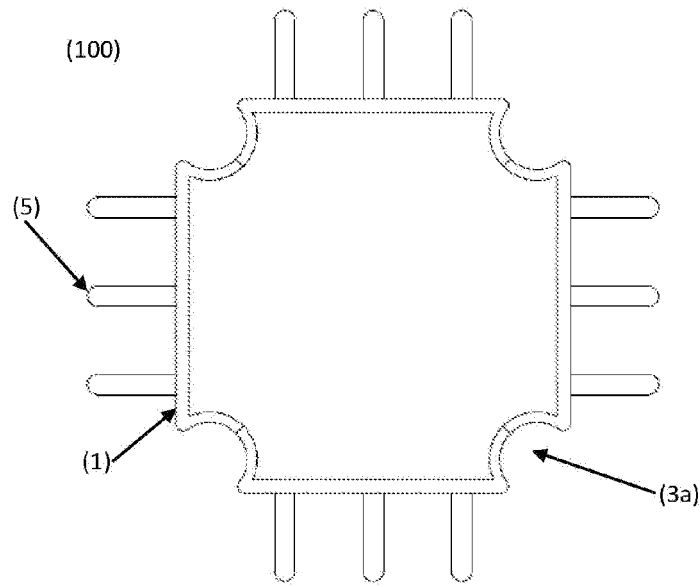
FIG. 17 shows the top view of a connecting device or connector, with square section channels and four vertices, according to an embodiment of the invention.
Figure 18:
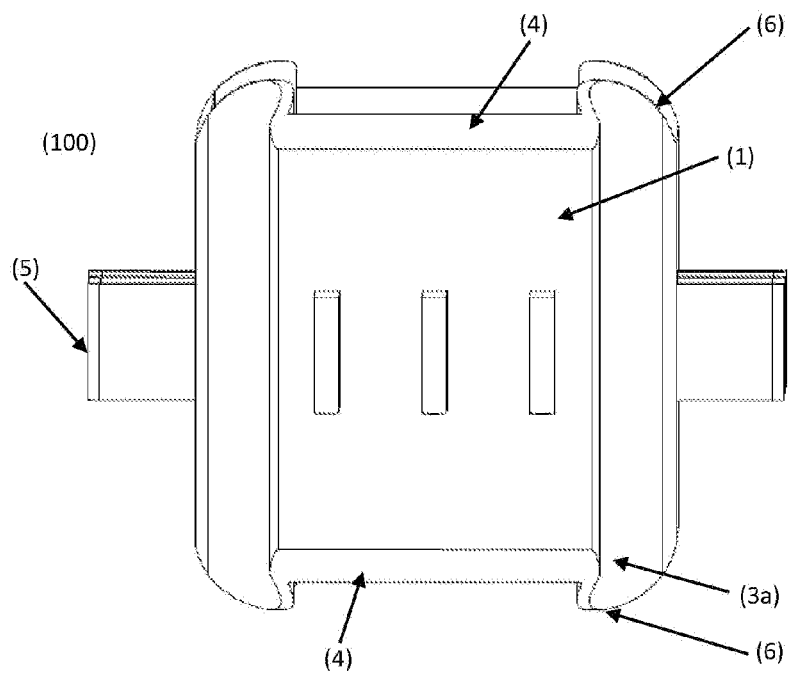
FIG. 18 shows the side view of a connecting device or connector, with square section channels and four vertices, according to an embodiment of the invention.
Figure 19:
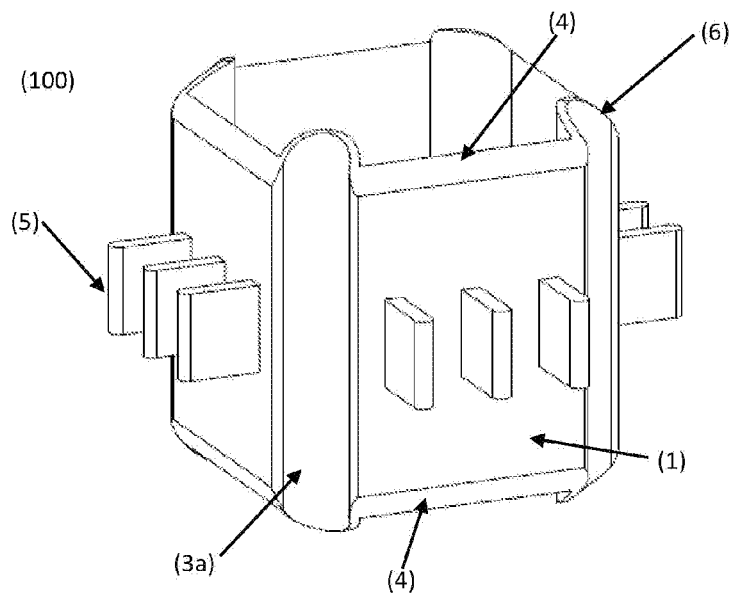
FIG. 19 shows the perspective view of a connecting device or connector, with square section channels and four vertices, according to an embodiment of the invention.

In another embodiment of the invention, the cross-section of the tubular body (1) of the device (100) is square. In this embodiment, the device (100) preferably comprises of at least two channels or grooves (3a) at opposite corners of said square section, as shown in FIGS. 14 to 16.

In the case that the cross section of the tubular body (1) is square, the device (100) comprises channels or grooves (3a) on the four corners of said square cross section, as shown in FIGS. 17 to 20. Alternatively, channels or grooves (3a) in the cross section of the square tubular body (1) may be arranged on the sides of said section.

The portion (2) with the larger cross-section has a similar profile to the tubular shape. In one embodiment of the invention, said portion (2) with larger cross-section comprises a number of fins, teeth or projections (5), distant from each other. Said fins or protruding teeth (5) are at least two per each side, in the case that the cross section of the tubular body (1) is square. These projections (5) seen in the embodiments shown by FIGS. 4 to 25.

Figure 13:
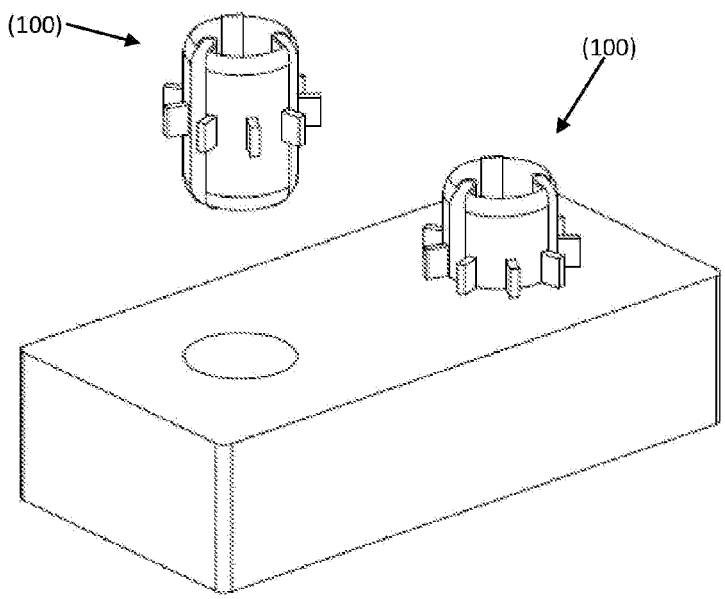
FIG. 13 shows the assembly view in a brick with circular perforations of a connecting device or connector, with circular section and three channels, according to an embodiment of the invention
Figure 20:
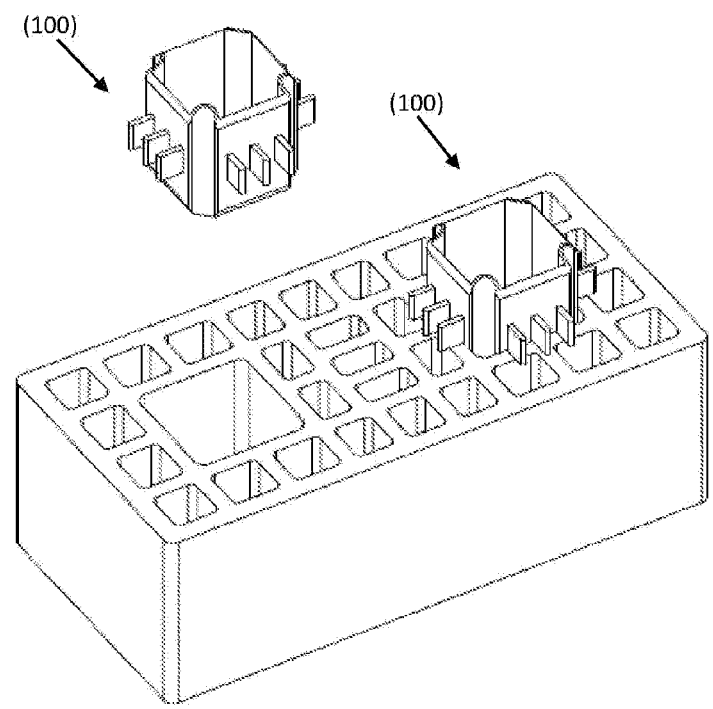
FIG. 20 shows the assembly view with a brick with square perforations a connecting device or connector, with square section channels and four vertices, according to an embodiment of the invention.

FIGS. 13 and 20 represent typical installations of the connector (100) in some of its forms. FIG. 13 depicts the mounting of a device (100) with circular tubular body (1) for bricks which have circular openings.

FIG. 20 shows the mounting of a device (100) with square cross section of the tubular body (1) for bricks which have square holes.

Figure 21:
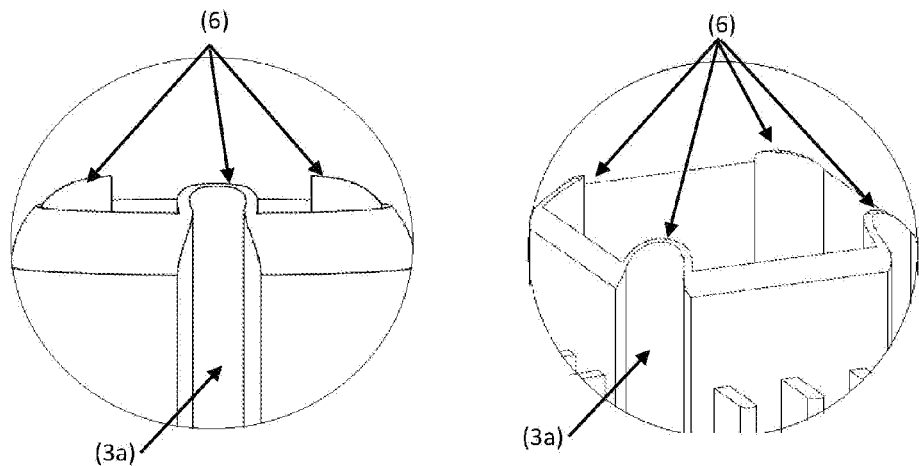
FIG. 21 shows a detail of the nail or flap, according to some embodiments of the invention.
Figure 22:
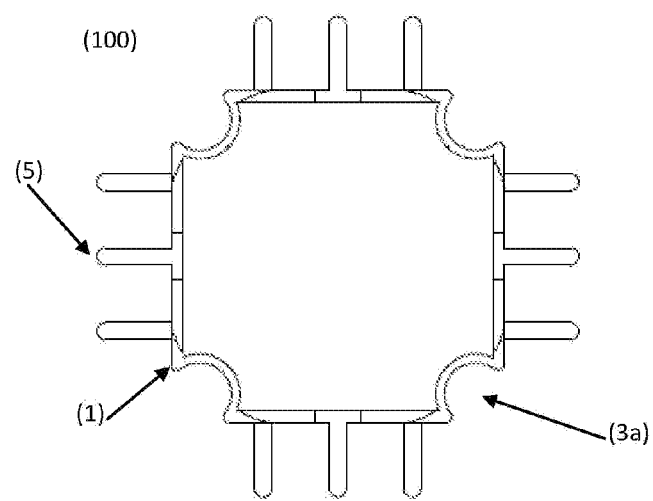
FIG. 22 shows the top view of a connecting device or connector, with square section, four channels at the vertices, according to a seventh preferred embodiment of the invention, similar to the former (FIGS. 17 to 20) but with slots in the flat faces of the connector.
Figure 23:
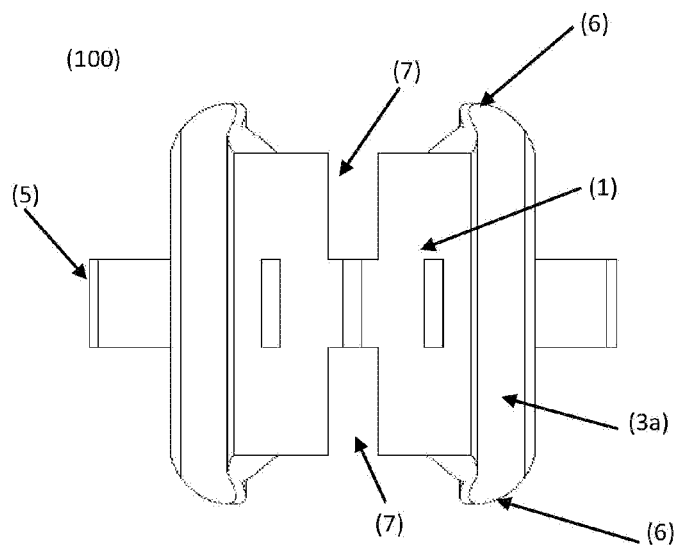
FIG. 23 shows the side view of a connecting device or connector, with square section, four channels at the vertices, faces and slots, according to the seventh embodiment of the invention.
Figure 24:
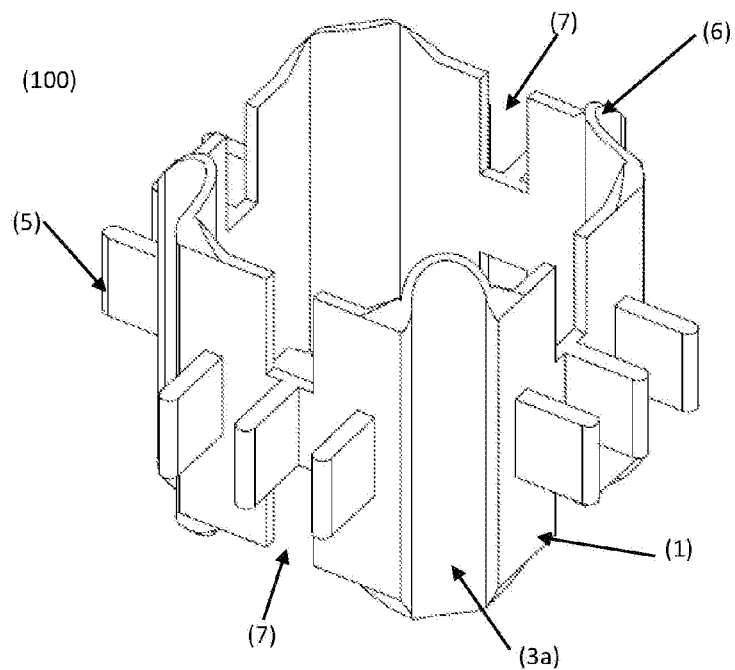
FIG. 24 shows the perspective view of a connecting device or connector, with square section, four channels at the vertices, faces and slots, according to the seventh embodiment of the invention.
Figure 25:
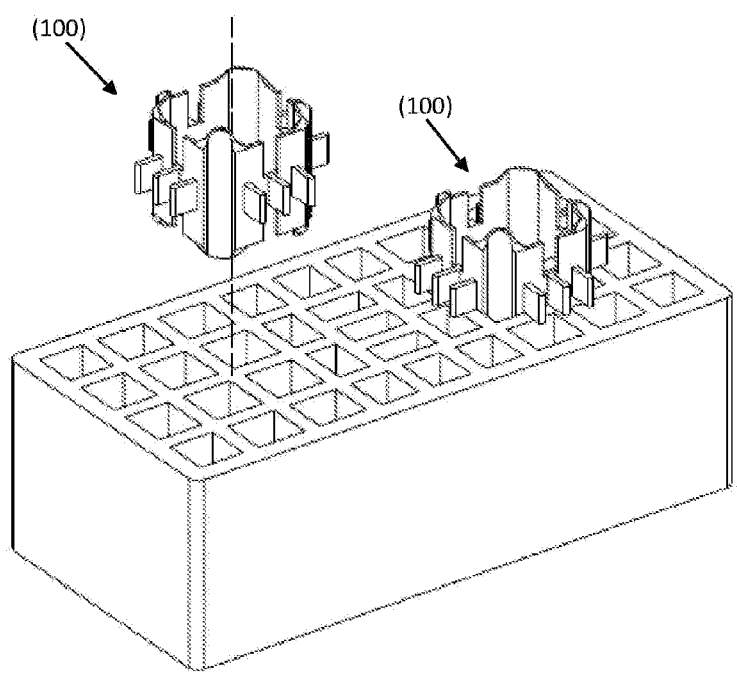
FIG. 25 shows the assembly view with a brick with square perforations a connecting device or connector, with square section, four channels at the vertices, faces and slots, according to an embodiment of the invention illustrated in the FIGS. 22 to 24.

FIG. 21 shows a detail of the nail or flap (6) in some of the embodiments of the invention. In these details it can be observed that the nail (6) protrudes from the tubular body (1), thus facilitating both the mounting of the connector in the brick, and placing a top brick on an already mounted connector.

In another embodiment of the invention, the tubular body has a number of longitudinal slots (7), which extend from each end of the tubular body to the central portion of greater dimension (2) with a cross section or outgoings (5), as appropriate. This type of connector is applicable to bricks or blocks with small holes, as is observed in FIG. 25 which allows the tubular body to fit to a set of brick cavities.

The device for connecting and separating bricks enables a construction procedure, claimed in the application PCT WO2015181582, which consists of building walls with only bricks and connectors for injecting mortar ex post through the slots that occur between the bricks. The channels which allow the device to conform to variations in the holes also make it possible to correct certain imperfections in the walls after being built and those produced by variations in the bricks.

The connector is preferably plastic and efficient manufacturing is through the process called Injection (molding).

The invention claimed is:

1. A device for connecting and separating of masonry units, comprising:
    a tubular body configured to fit in a tubular shape of holes of the masonry units, the tubular body having a longitudinal axis, at least one groove or channel extending along an entire length of the tubular body and configured to reduce a perimeter or transverse profile of the tubular body to adapt to dimensional variations in the holes of the masonry units, the at least one groove or channel extends parallel to the longitudinal axis, and the tubular body having opposite ends and a portion with a cross-section of greater dimension than a respective cross-section of the tubular body at each of the opposite ends, the portion with the cross section of greater dimension being formed by a plurality of fins, teeth, or projections that are each elongated in a direction along the length of the tubular body, and the portion with the cross section of greater dimension configured to produce separation between the masonry units connected by the tubular body,
    wherein each of the fins, teeth, or projections has:
        a first end edge and a second end edge, the first end edge and the second end edge each extending radially from an outer surface of the tubular body, and the first end edge and the second end edge are perpendicular to the longitudinal axis of the tubular body;
        a radial edge that interconnects the first end edge and the second end edge, the radial edge extending parallel to the longitudinal axis of the tubular body;
        a first side surface projecting radially from the outer surface, the first side surface adjoins the first end edge, the second end edge, and the radial edge;
        a second side surface projecting radially from the outer surface, the second side surface is parallel to the first side surface and adjoins the first end edge, the second end edge, and the radial edge;
        a constant thickness between the first side surface and the second side surface; and
        an axial length between the first end edge and the second end edge is greater than the thickness between the first side surface and the second side surface, the axial length extending parallel to the longitudinal axis.

2. The device according to claim 1, wherein the portion with the cross section of greater dimension than the cross section of the tubular body is proximal to half the length of the tubular body.

3. The device according to claim 2, wherein the tubular body comprises a plurality of longitudinal slots extending from both ends of the tubular body to the portion with the cross-section of greater dimension, the longitudinal slots allowing the tubular body to fit within a set of the holes in each of the masonry units.

4. The device according to claim 1, wherein each of the opposite ends comprises a recess or chamfer, curved or straight, towards an outside of the tubular body and configured to facilitate the fitting of the tubular body into the holes of the masonry units.

5. The device according to claim 4, wherein the transverse profile of the tubular body is circular and the at least one groove or channel is at least three channels or grooves.

6. The device according to claim 4, wherein the transverse profile of the tubular body is square, and the at least one groove or channel includes at least two channels or grooves in opposite corners of the square transverse profile.

7. The device according to claim 6, wherein the square transverse profile of the tubular body has four corners, and the at least one groove or channel includes a channel or groove in each of the four corners.

8. The device according to claim 1, wherein the portion with the cross-section with greater dimension has a same shape to the transverse profile of the tubular body.

9. The device according to claim 1, wherein the masonry units are bricks.

10. A tubular body for connecting and separating masonry units comprising:
tubular end portions configured to fit in holes of the masonry units to connect the masonry units, the tubular end portions disposed at opposite ends of the tubular body;
at least one groove or channel extending along an entire length of the tubular body, the at least one groove or channel extends parallel to a longitudinal axis of the tubular body, the at least one groove or channel configured to reduce a perimeter or transverse profile of the tubular body such that the tubular end portions adapt to dimensional variations in the holes of the masonry units; and
a middle portion disposed between the tubular end portions, a cross-section of the middle portion having a greater dimension than a respective cross-section of each of the tubular end portions, the middle portion being formed by a plurality of fins, teeth, or projections that are each elongated in a direction along the length of the tubular body, the middle portion configured to provide separation between the masonry units connected by the tubular body,
wherein each of the fins, teeth, or projections has:
a first end edge and a second end edge, the first end edge and the second end edge each extending radially from an outer surface of the tubular body, and the first end edge and the second end edge are perpendicular to the longitudinal axis of the tubular body;
a radial edge that interconnects the first end edge and the second end edge, the radial edge extending parallel to the longitudinal axis of the tubular body;
a first side surface projecting radially from the outer surface, and the first side surface adjoins the first end edge, the second end edge, and the radial edge;
a second side surface projecting radially from the outer surface, the second side surface is parallel to the first side surface and adjoins the first end edge, the second end edge, and the radial edge;
a constant thickness between the first side surface and the second side surface; and
an axial length between the first end edge and the second end edge is greater than the thickness between the first side surface and the second side surface, the axial length extending parallel to the longitudinal axis.

11. The tubular body according to claim 10, wherein the middle portion is proximal to half of the length of the tubular body.

12. The tubular body according to claim 10, wherein each of the tubular end portions includes a recess or chamfer towards an outside of the tubular body configured to facilitate the fitting of the tubular end portions into the holes of the masonry units.

13. The tubular body according to claim 10, wherein the transverse profile of the tubular body is circular and the at least one groove or channel is at least three channels or grooves.

14. The tubular body according to claim 10, wherein the transverse profile of the tubular body is square, and the at least one groove or channel includes two or more grooves or channels disposed in opposite corners of the square transverse profile.

15. The tubular body according to claim 14, wherein the square transverse profile of the tubular body has four corners, and the at least one groove or channel includes a channel or groove in each of the four corners.

16. The tubular body according to claim 10, wherein an outside of the cross-section of the middle portion has a same shape as an outside of the cross-section of one of the tubular end portions.

17. The tubular body according to claim 10, further comprising:
a plurality of longitudinal slots extending from both of the opposite ends of the tubular body, the plurality of longitudinal slots configured to allow the tubular end portions to fit within a set of the holes in each of the masonry units.

18. A construction element comprising:
masonry units each including holes; and
a tubular body comprising:
tubular end portions fit in the holes of the masonry units to connect the masonry units, the tubular end portions disposed at opposite ends of the tubular body;
at least one groove or channel extending along an entire length of the tubular body, the at least one groove or channel extends parallel to a longitudinal axis of the tubular body, the at least one groove or channel configured to reduce a perimeter or transverse profile of the tubular body such that the tubular end portions adapt to dimensional variations in the holes of the masonry units; and
a middle portion disposed between the tubular end portions, a cross-section of the middle portion having a greater dimension than a respective cross-section of each of the tubular end portions, the middle portion providing separation between the masonry units connected by the tubular body, the middle portion includes a plurality of fins, teeth, or projections that are each elongated in a direction along the length of the tubular body, wherein each of the fins, teeth, or projections has:
a first end edge and a second end edge, the first end edge and the second end edge each extending radially from an outer surface of the tubular body, and the first end edge and the second end edge perpendicular to the longitudinal axis of the tubular body;
a radial edge that interconnects the first end edge and the second end edge, the radial edge extending parallel to the longitudinal axis of the tubular body;

a first side surface projecting radially from the outer surface of the tubular body, the first side surface adjoins the first end edge, the second end edge, and the radial edge;

a second side surface projecting radially from the outer surface, the second side surface is parallel to the first side surface and adjoins the first end edge, the second end edge, and the radial edge;

a constant thickness between the first side surface and the second side surface; and an axial length between the first end edge and the second end edge that is greater than the thickness between the first side surface and the second side surface, the axial length extending parallel to the longitudinal axis.

19. The construction element according to claim 18, wherein the masonry units are joined together by mortar disposed in the separation provided by the middle portion of the tubular body.

\* \* \* \* \*